Nov. 9, 1926.                                                          1,605,934
J. K. GEHRET ET AL
APPARATUS FOR FABRICATING WIRE MESH
Filed August 13, 1925    9 Sheets-Sheet 6
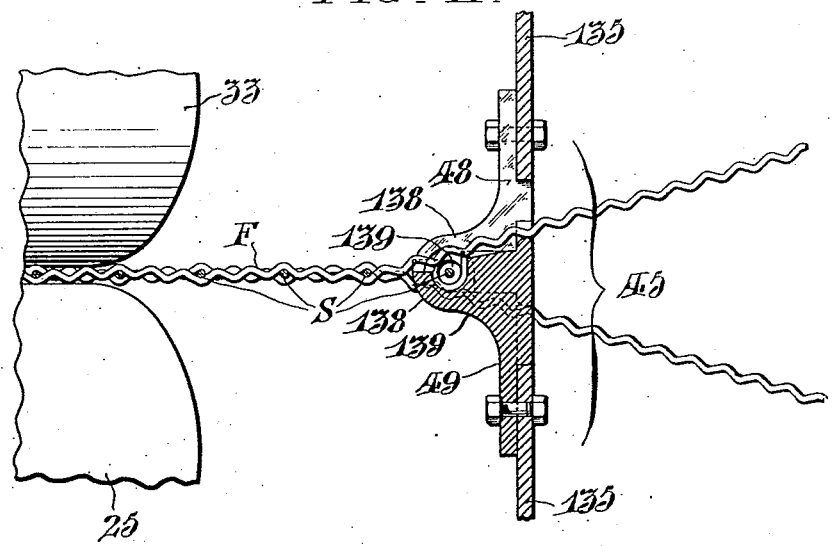
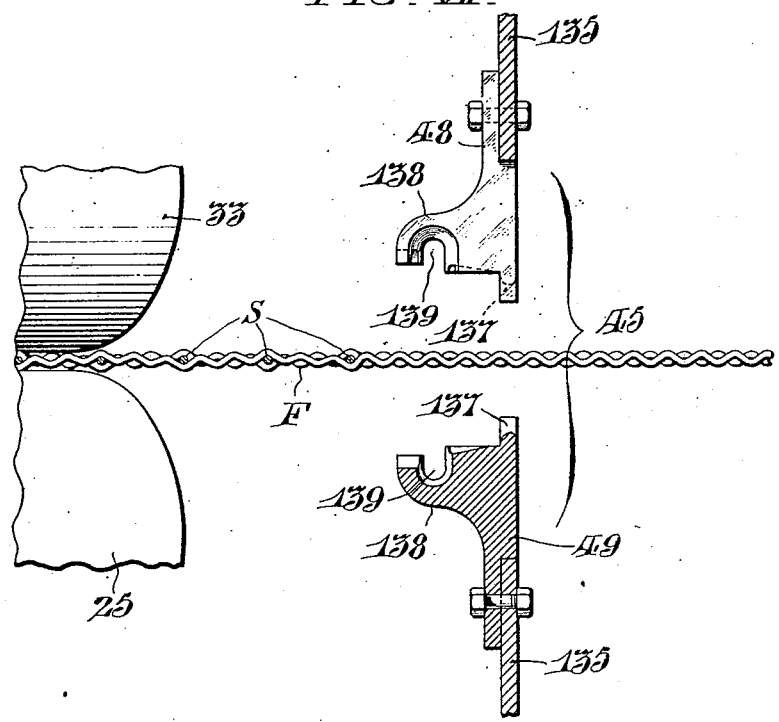
WITNESSES
John C. Bergner
Thomas W. Kerr, Jr.
INVENTOR:
John K. Gehret &
Mahlon P. Gehret,
BY Fraley Paul
ATTORNEYS.

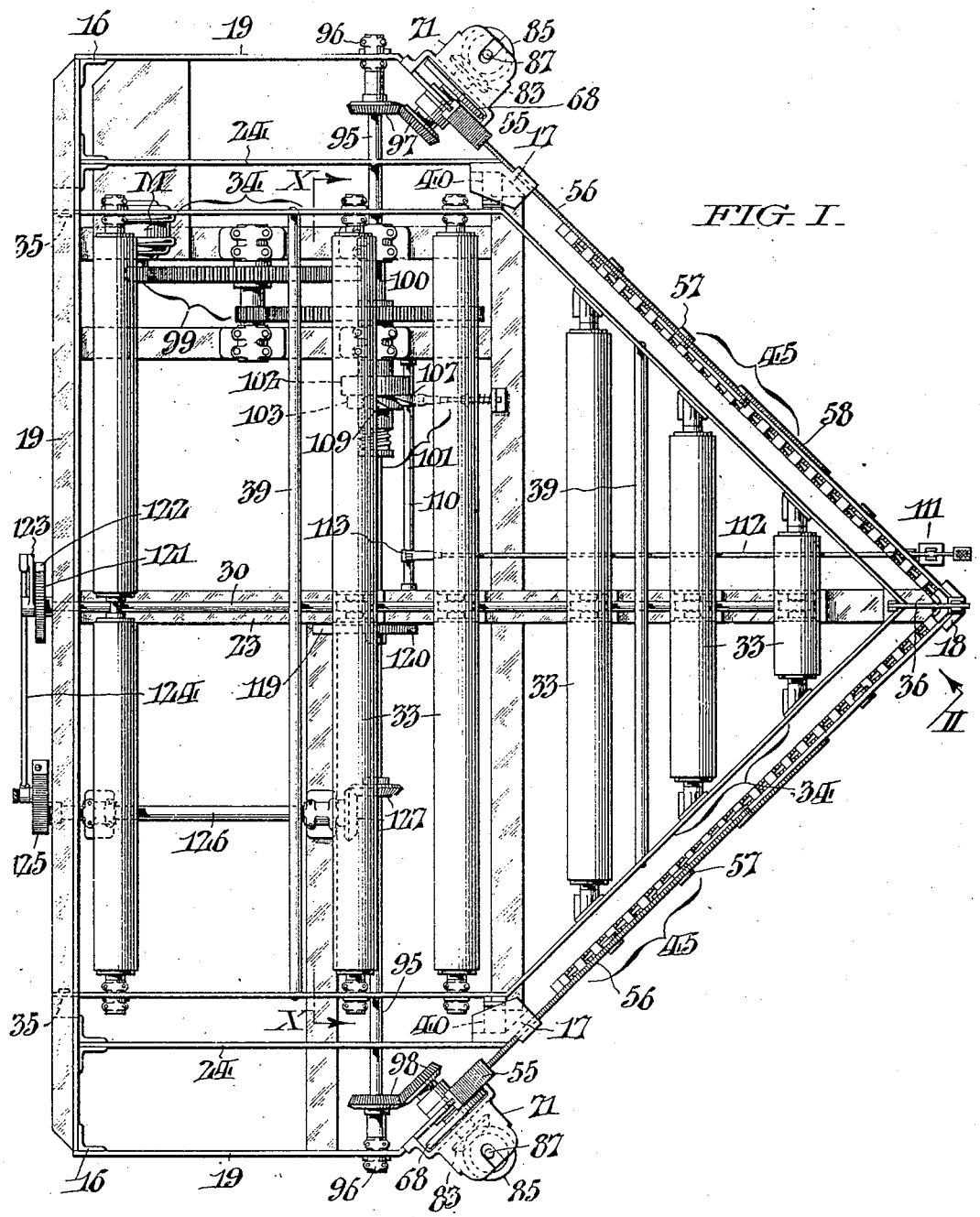

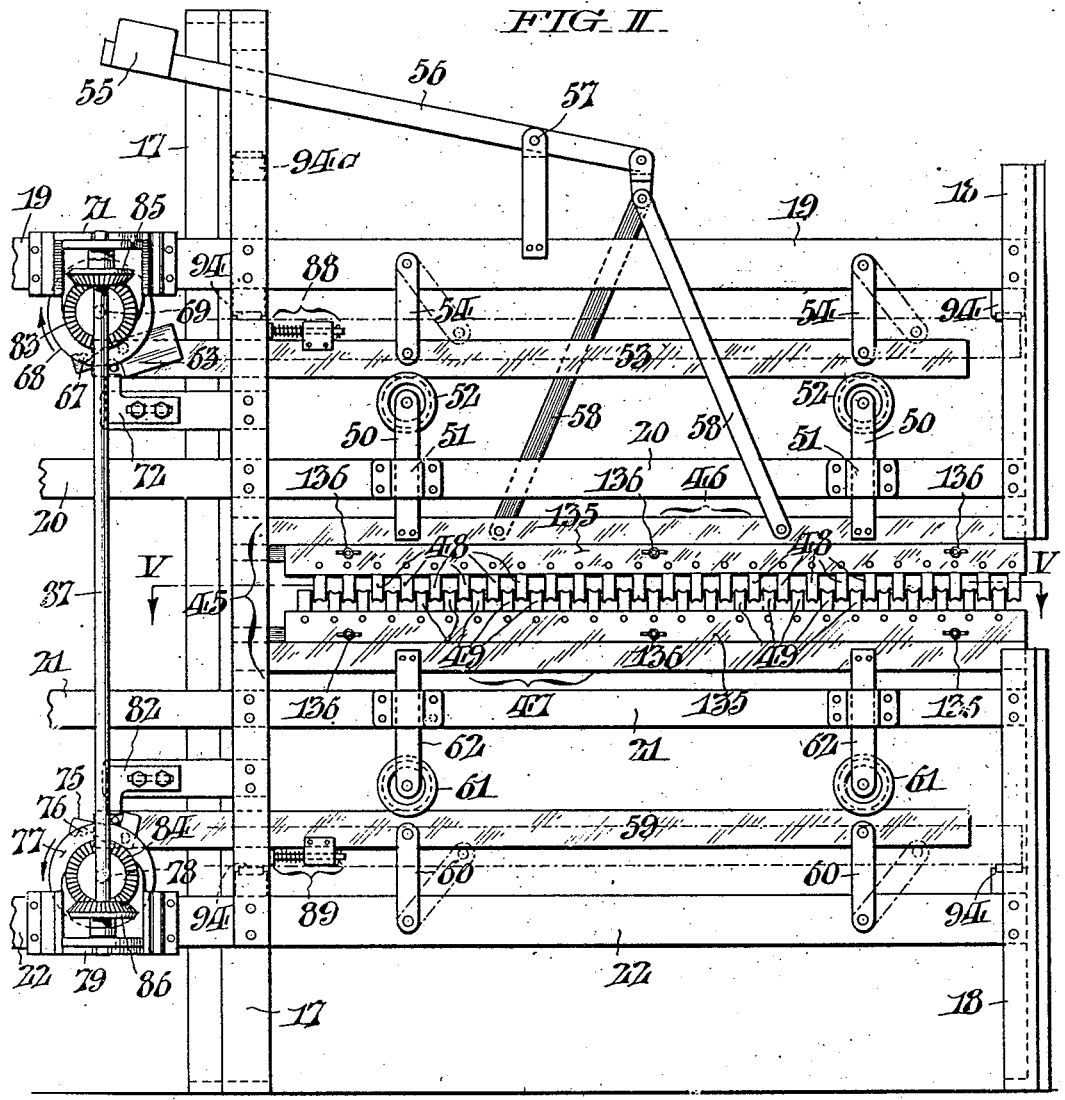
FIG. II.
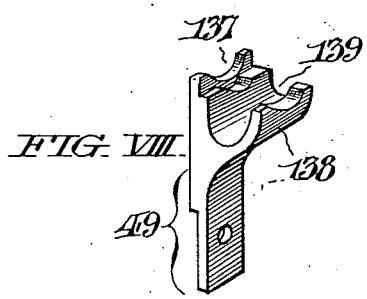
FIG. VIII.

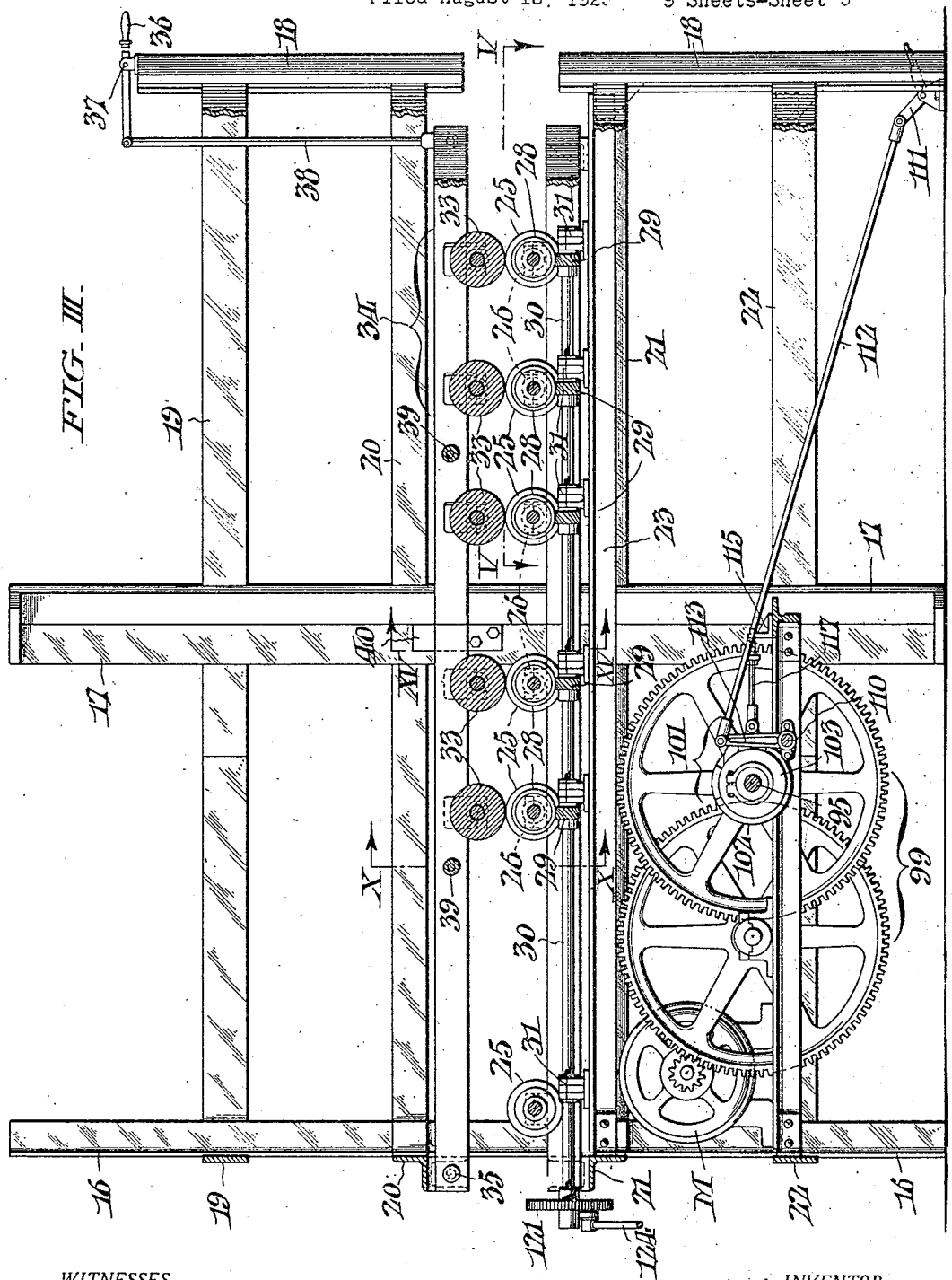

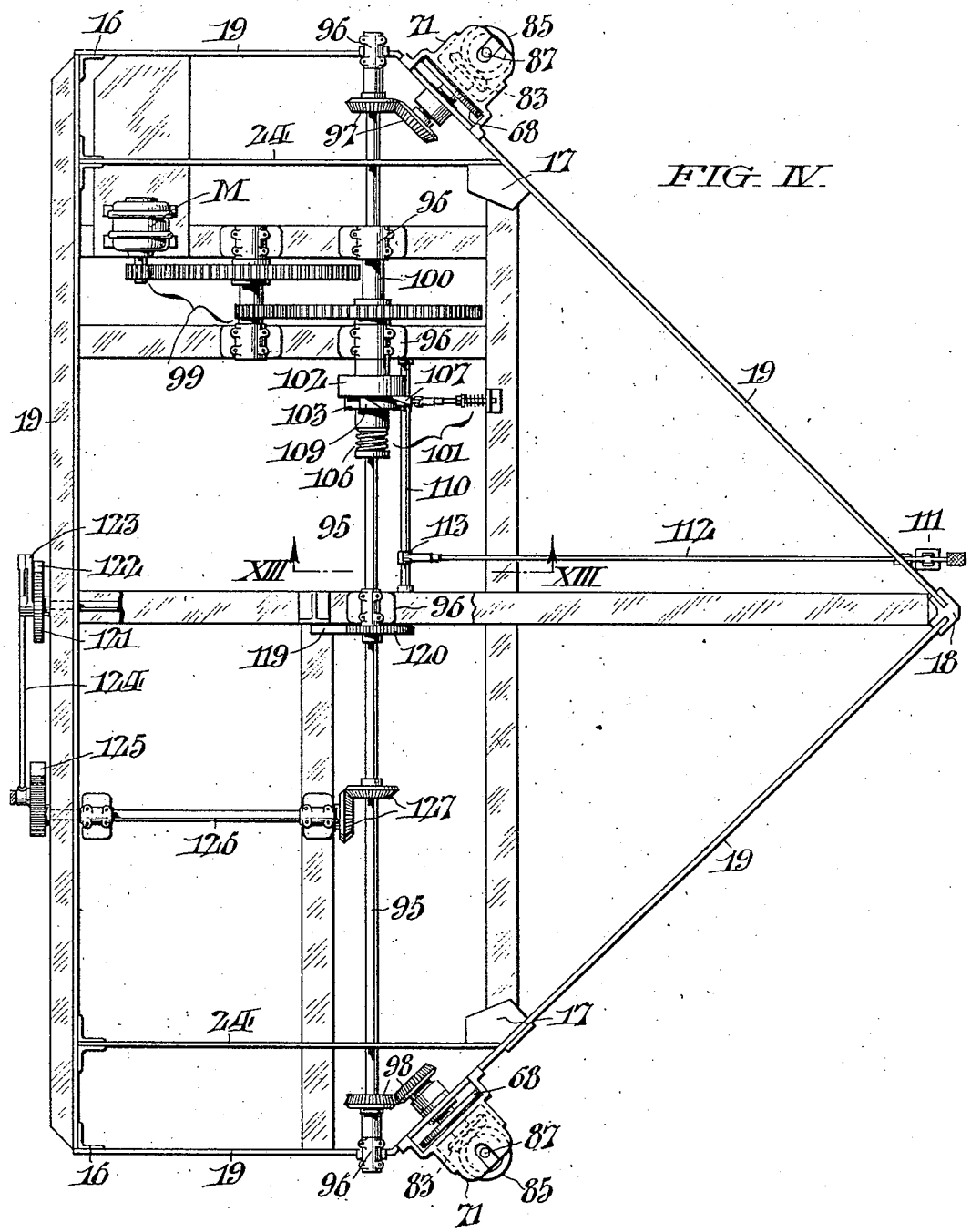

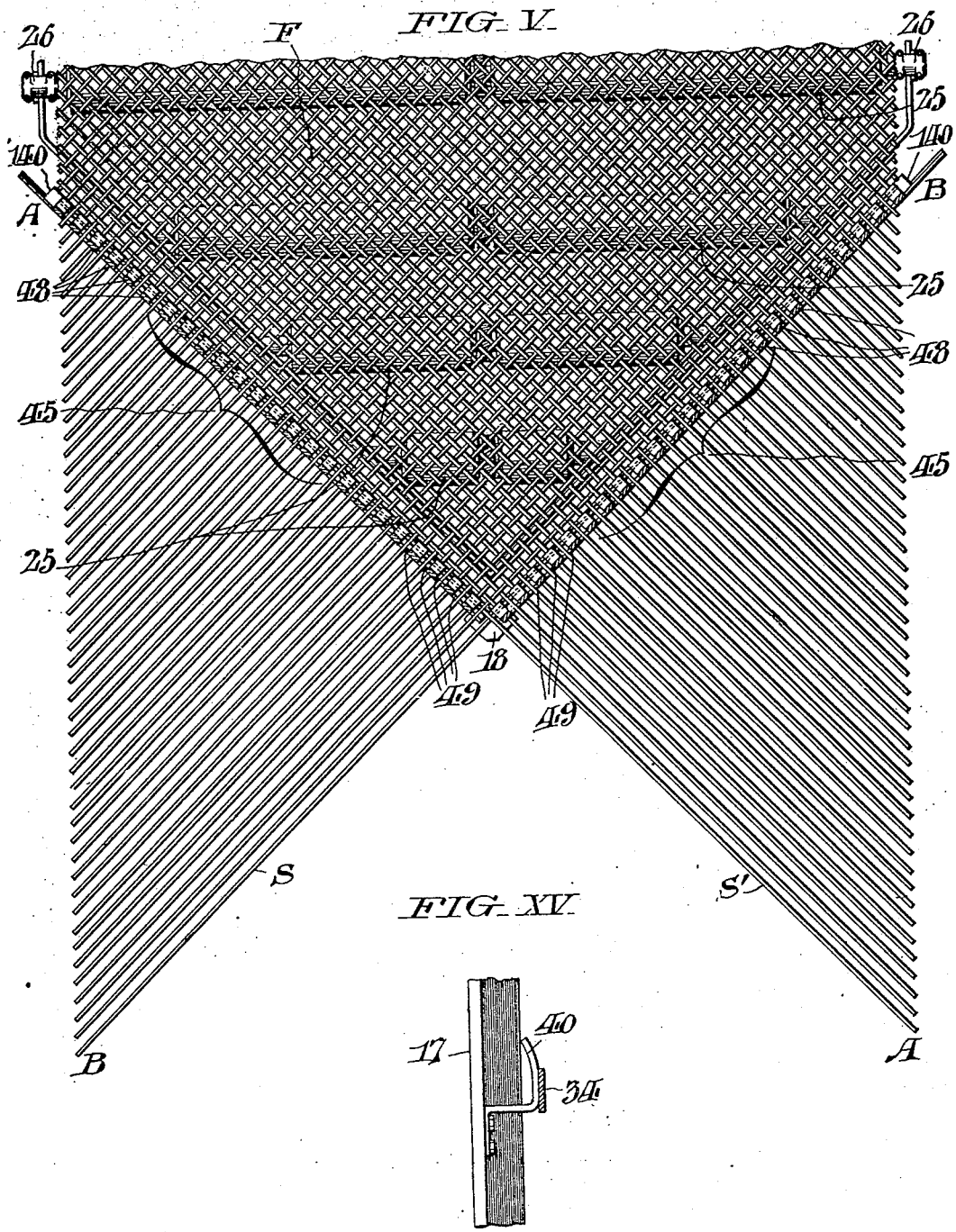

Nov. 9, 1926.  1,605,934
J. K. GEHRET ET AL
APPARATUS FOR FABRICATING WIRE MESH
Filed August 13, 1925   9 Sheets-Sheet 7
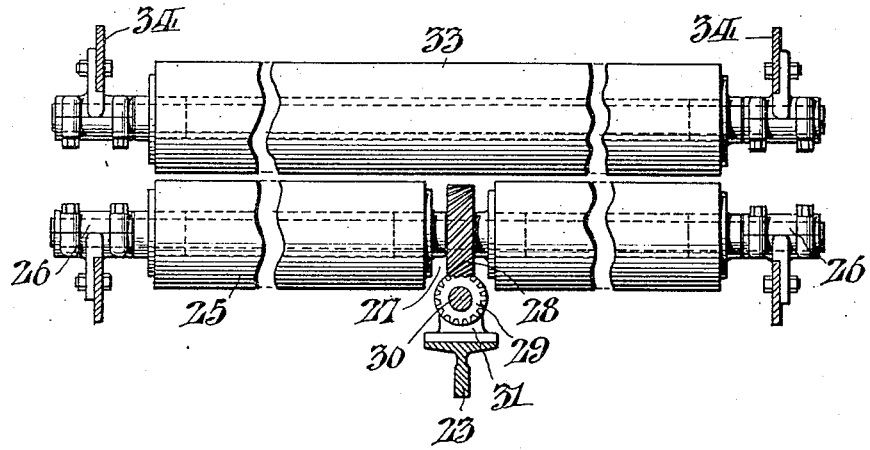
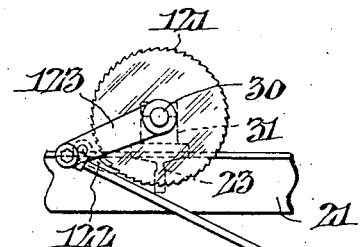
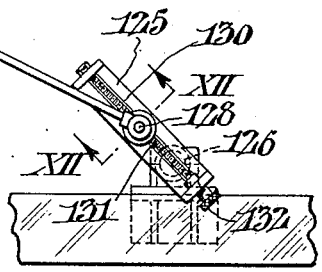
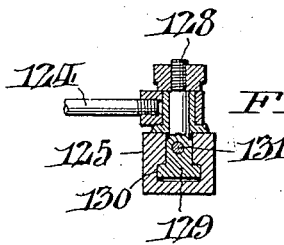
WITNESSES
INVENTOR:
John K. Gehret &
Mahlon P. Gehret,
BY
ATTORNEYS.

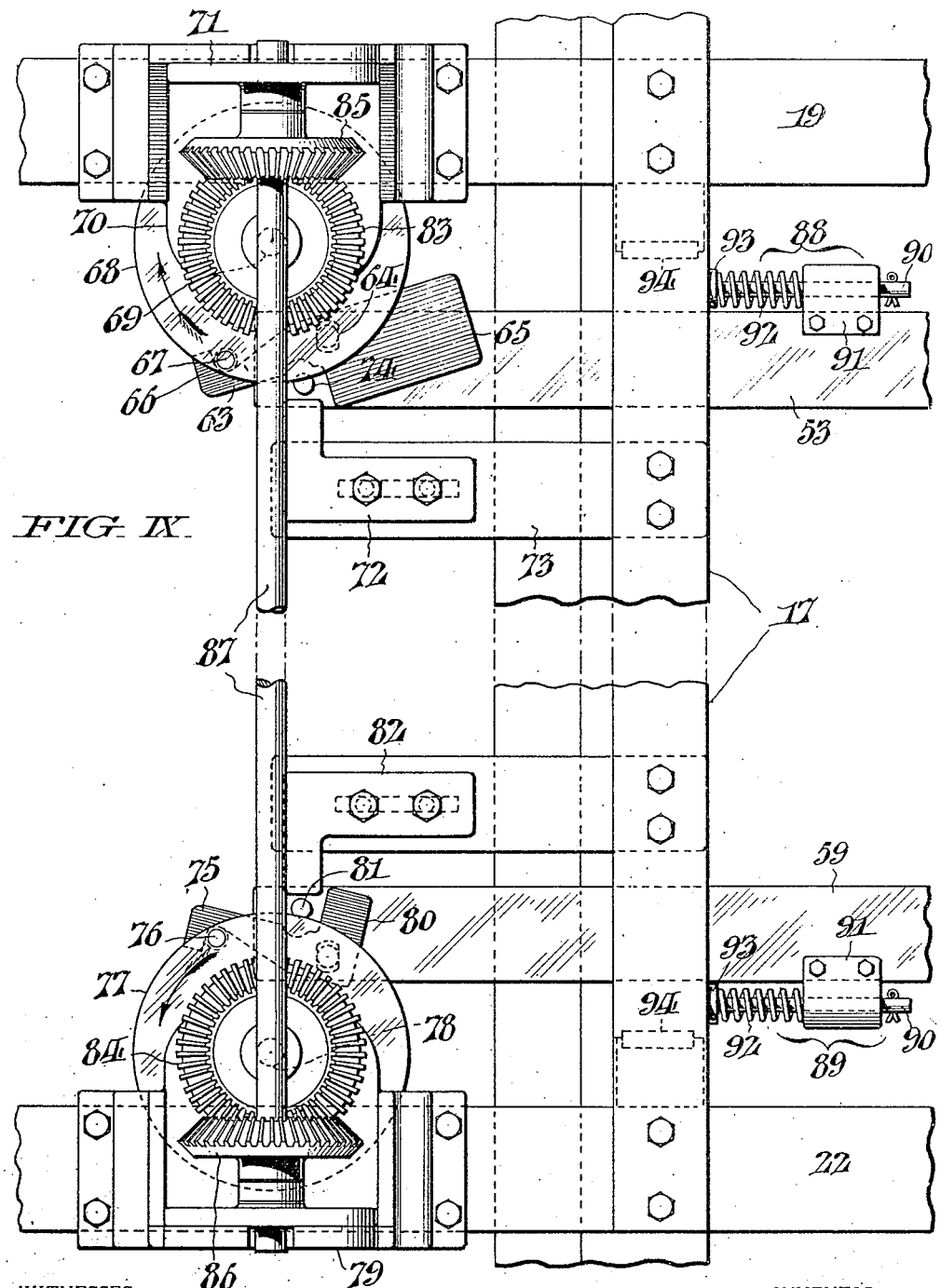

Nov. 9, 1926.  1,605,934
J. K. GEHRET ET AL
APPARATUS FOR FABRICATING WIRE MESH
Filed August 13, 1925    9 Sheets-Sheet 9
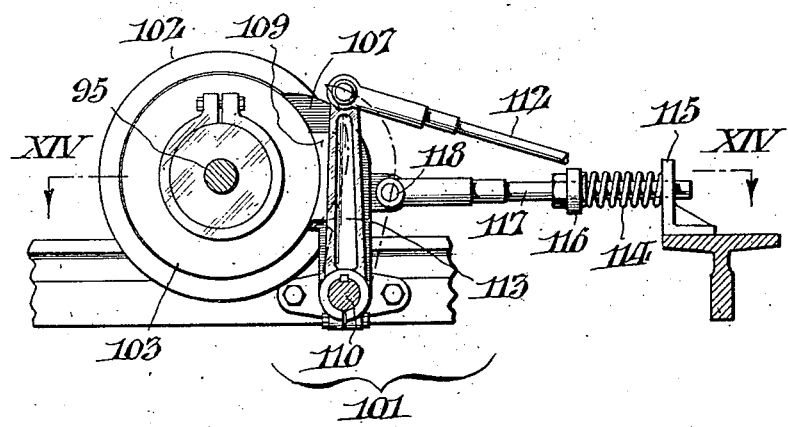
FIG. XIII.
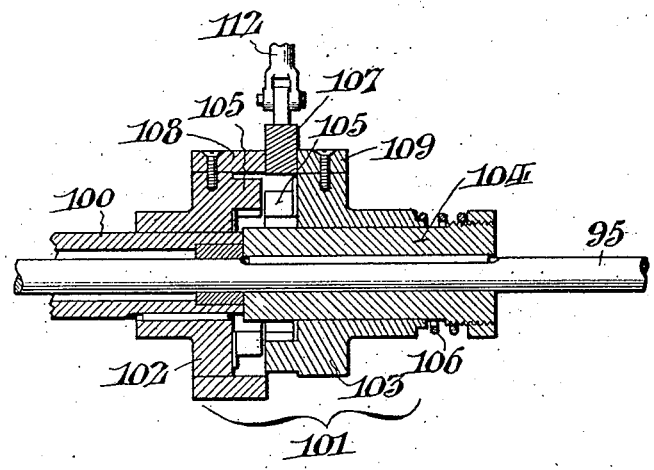
FIG. XIV.
WITNESSES
John C. Bergner
Thomas W. Kerr, Jr.
INVENTOR:
John K. Gehret &
Mahlon P. Gehret,
BY Fraley & Paul
ATTORNEYS.

Patented Nov. 9, 1926.

1,605,934

UNITED STATES PATENT OFFICE.

JOHN K. GEHRET, OF NORRISTOWN, AND MAHLON P. GEHRET, OF BRIDGEPORT, PENNSYLVANIA.

APPARATUS FOR FABRICATING WIRE MESH.

Application filed August 13, 1925. Serial No. 49,988.

This invention relates to apparatus or machines for fabricating wire mesh and is concerned, more particularly, with a type intended for producing metallic fabric of stout crimped wire useful in the manufacture of protective screens for windows, doors, etc., and characterized by having the mesh openings comparatively large and disposed diagonally relative to the fabric side edges.

Fabrication of wire mesh of the specific variety mentioned, is dependent upon successive formation of angularly-disposed sheds of wire ends trailing from previously-formed fabric with alternate reversals in the relation of such ends for reception of new strands in crossed relation, and successive incorporation of these new strands in the fabric through intermittent progression of the latter during periods between consecutive shed formations. Apparatus heretofore available for weaving diamond wire mesh in accordance with the principle briefly outlined, was usually designed for manual operation, requiring not only special skill on the part of the weaver, but extreme physical effort in manipulation, thereby rendering production very slow and costly, and often with the output faulty or irregular, as well as necessitating trimming with consequent wastage of material.

The main object of our invention is to overcome the various difficulties above pointed out,—that is to say,—to enable fabrication of diamond wire mesh more economically than heretofore and without wastage of material; and to provide an efficient apparatus whereby this may be expeditiously accomplished with minimum labor and expense, as well as without requiring any special skill on the part of the operator.

Another object of the present invention is to secure the foregoing advantages in a weaving apparatus capable of ready and quick adaptation to fabrication of wire mesh differing in the pitch or distance between adjacent wire strands.

Still other objects and attendant advantages will be manifest from the detailed description, which follows, of the typical embodiment of our invention illustrated by the drawings herewith; and in which Fig. I, is a plan view.

Fig. II, is a fragmentary side elevation of the apparatus viewed in the direction of the arrows II—II in Fig. I.

Fig. III, is a longitudinal sectional view of the organization, with various portions in the background omitted to avoid confusion.

Fig. IV, is a plan view of the apparatus with certain parts in the upper portion of the structure omitted to expose the details of the driving mechanism and the control therefor.

Fig. V, is a diagrammatic fragmentary detail plan section showing the manner of formation of the wire mesh, the section being taken as indicated by the arrows V—V in Figs. II and III.

Figs. VI and VII, are detail sectional views showing the operation of the shed forming means.

Fig. VIII, is a perspective view of one of the wire engaging instrumentalities employed in connection with the shed formers.

Fig. IX, is a fragmentary elevation, on a larger scale than the preceding illustrations, of the mechanism provided for actuating each of the shed formers.

Fig. X, is a local section taken as indicated by the arrows X—X in Figs. I and III, the view being considerably contracted laterally by breaks at convenient intermediate regions.

Fig. XI, is a fragmentary elevation of the mechanism for progressing the metallic fabric through the apparatus.

Fig. XII, is a detail section taken as indicated by the arrows XII—XII in Fig. XI.

Fig. XIII, is a section, viewed in the direction of the arrows XIII—XIII in Fig. IV, showing the clutch mechanism for controlling operation of the apparatus.

Fig. XIV, is an axial section of the clutch mechanism along the plane indicated by the arrows XIV—XIV in Fig. XIII; and Fig. XV, is an illustration showing a detail of the apparatus frame taken as indicated by the arrows XV—XV in Fig. III.

Referring more particularly to Figs. I and IV of the drawings, it will be observed that the main frame of the apparatus is rectangular at the rear end, while its sides approach each other symmetrically at the forward end to meet substantially in a right angle, with the apex thereof in the median line of the structure. In the illustrated apparatus the main frame is built entirely of standard structural iron shapes, comprising rear corner uprights 16, intermediate side columns 17, 17, and a single centrally-located frontal column 18 at the juncture of the angular sides; as well as a series of perimetric horizontals which are bolted or otherwise secured to the several uprights and consecutively numbered 19–22 inclusive, reading downwards in Fig. 11. At the level of the horizontal 21, the frame is braced internally (see Figs. I and III), by a longitudinal beam 23, and also by parallel struts 24 that tie the side columns 17 to the rear of the frame structure.

In the course of manufacture, the metallic fabric (indicated F in Fig. V) is supported upon a horizontal series of rollers 25 whereby it is also progressed through the apparatus. These rollers 25 are located at suitable intervals lengthwise of the structure and journalled for rotation in appropriate bearings 26 supported by the main frame. As shown in Fig. X, the rollers 25 are made in two sections with provision, in each instance, of a central space 27 to accommodate a spiral gear 28 which is fixed on the roller shaft and adapted to be driven by an intermeshing spiral pinion 29. The several pinions 29 are fast on a line shaft 30, extending lengthwise of the apparatus—see Figs. I and III, which rotates in journal bearings 31 mounted upon the longitudinal bracing beam 23. As later on explained, the line shaft 30 is intermittently rotated to similarly move the metallic fabric F (Fig. V) as each new pair of strands S, S' is incorporated. In order to increase the tractive action of the rollers 25, I provide a corresponding series of cooperating rollers 33 that are mounted, with capacity for free rotation, in a horizontal overhanging frame 34 which is pivoted at 35 to the rear end of the main frame so that its forward end can be lifted to enable initial threading of a starting piece or length of fabric F. The means provided for lifting the frame 34 in the manner just noted, includes a lever handle 36 (see Figs. I and III) fulcrumed at 37 to the top of the frontal column 18 and connected with said frame 34 by a drop link 38. To ensure greater rigidity against distortion under the weight of the rollers 33, the frame 34 is braced by tie bars 39, while it is prevented from lateral shifting during movement, by guides 40, one being disposed at each side of the apparatus—see Fig. I—and bolted to the adjoining intermediate side column 17 of the main frame, as illustrated in Fig. XV.

Referring more particularly to Fig. V, it will be apparent that in the weaving of the metallic fabric F, it is necessary to form a double shed along the lines A—A and B—B to enable, at each actuation of the apparatus, the incorporation of two new wire strands in crossed relation for each intermittent progression of the fabric F whereby the pitch—or the spacing—of the strands S, S' is determined. For the purpose mentioned, I employ what may conveniently be termed "shed formers," comprehensively designated 45 in the several illustrations. These shed formers 45 are identical in construction, and respectively occupy the angular sides of the main frame, one of them being shown complete in side elevation in Fig. II. Each of the shed formers 45 comprises upper and lower opposing members or jaws 46, 47 respectively provided with projecting instrumentalities having the form of teeth 48, 49 that are adapted to intermesh when in the closed or shed-forming position illustrated. The upper member 46 is guided for reciprocative movement through engagement of its opposite ends in suitable slots afforded by the columns 17, 18, and it is equipped with spaced upward projections 50 that extend through guides 51 on the horizontal 20 of the main frame for attachment of circumferentially grooved anti-friction rollers 52. These anti-friction rollers 52 are acted upon by mechanism which includes a longitudinally shiftable bar 53, hung from the upper frame horizontal 19 by a pair of links 54, so as to engage within the circumferential grooves of the rollers 52. Downward movement of the upper shed forming member 46 is opposed by a weight 55 adjustable along one end of a lever 56, which is fulcrumed at 57 to the upper frame horizontal 19, and connected at the opposite end directly to said forming member 46 by a pair of straddle links 58. The lower shed forming member 47 is likewise guided for vertical reciprocation with its ends engaging appropriate slots afforded by the columns 17, 18 and it is actuated in a similar manner, but, in opposition to its own weight, by a longitudinally-shiftable bar 59 pivotally connected to the lower frame horizontal 22 by links 60 which engage grooved anti-friction rollers 61 mounted on depending projections 62 of said lower member 47.

The shiftable bars 53 and 59 are simultaneously actuated by mechanism shown at the left hand end of Fig. II, and in greater detail to a larger scale in Fig. IX. In the case of the upper bar 53, I employ at the left hand end thereof, a gravity latch 63 which is pivoted on a stud 64 and counterweighted at 65 for engagement of its hooked end 66 with the pin 67 on a rotatable disc 68. This disc 68 is fixed upon a stub shaft 69 journalled in the depending bearing 70 of a bracket 71 bolted to the top frame horizontal 19. Incidental to rotation of the disc 68, in the direction indicated by the arrow thereon, the bar 53 will—obviously—be moved to the left as viewed in Fig. IX and the toothed member 46 thereby depressed. Disengagement between the hooked end 66 of the gravity latch 63 and the pin 67 on the disc 68, is automatically brought about, subsequently, by a trip 72 that lies within the path of the weighted end 65, said trip 72 being secured to a local extension 73 of the main frame, with capacity for adjustment, so that the exact moment of disengagement may be accurately predetermined in accordance with the extent of bar movement desired. A stop pin 74 on the shiftable bar 53 normally holds the latch 63 substantially in a horizontal position against the influence of its counterweight 65, so that its hooked end is always in readiness for coaction with the pin 67 on the rotating disc 68.

A similar group of cooperative parts is relied upon to actuate the lower shiftable bar 59,—that is to say,—a latch hook 75 pivoted to the left hand end of said bar is adapted for engagement by the pin 76 on a rotatable disc 77, mounted on a stub shaft 78 rotatable in a bearing bracket 79, observable as an exact counterpart of the bearing bracket 71. The latch hook 75, differs from the latch hook 63, however, in that the counter-weight is omitted, for the simple reason that said latch hook 75 gravitates into engagement with the pin 76, under the overbalancing influence of its hooked end. A lateral projection 80 is provided, in this instance, for cooperation with a stop pin 81, whereby the latch hook 75 is normally held in a horizontal position. The trip 82 for the latch hook 75 is likewise adjustable and mounted upon a local extension of the main frame. Simultaneous driving of the rotatable discs 68 and 77 is effected through the medium of miter gears 83, 84, respectively, on the stub shafts 69, 78, which mesh with companion miter bevels 85, 86 fixed on a vertical coordinating shaft 87. Thus, concurrent with each rotation of the coordinating shaft 87, the shiftable bars 53, 59 are moved from the dot-and-dash line positions to the full line positions shown in Fig. II.

For the purpose of assisting return movement of the shiftable bars 53, 59 to the dot-and-dash line positions upon d'sengagement of the latches 63, 75, I provide "kick-off" devices indicated respectively at 88, 89 in Figs II and IX. Each of these "kick-off" devices embodies a bolt 90 slidable in a fitting 91 secured to the corresponding shiftable bar, and subject to a spring 92 tending to urge a terminal head 93 against the contiguous side column 17. Thus, as the shiftable bars 53, 59 are moved to the left, (Fig. II) energy is stored in the springs 92, said energy being subsequently spent in initiating movement of the bars 53, 59 in the opposite direction; or, in other words, to move them sufficiently for advancement of the links 54, 60 beyond the vertical dead center thereby enabling gravity to complete movement of the bars 53, 59 to the dot-and-dash line positions. This "kick-off" and return movement will naturally be rapid, and in order to avoid incidental noise, as well as shock to the apparatus frame, I provide suitable buffers 94—of rubber or the like—against which the bars 53, 59 come to rest. Similar buffers 94ª Fig. II serve to cushion the fall of the weight levers 56.

The shed formers 45 at respectively opposite angular sides of the main frame must of course be simultaneously operated. To this end, the main shaft 95, see Figs. I and IV, extends the full width of the apparatus and is journalled in bearings 96, said shaft imparting power by means of miter gear couples 97, 98, to the stub shafts 78 of the actuating means associated with the two lower shiftable bars 59 for transmission, in turn, to the upper shiftable bar actuating means through the vertical coordinating shafts 87.

In the embodiment of this invention illustrated, the machine derives power from an electric motor conventionally indicated at M in Figs. I and IV. Affixed to the shaft of this motor M is a spur pinion which transmits motion, through an interposed train of speed reduction gears 99, to a sleeve 100 normally rotatable freely upon the main shaft 95. The power from the motor M is transmittible from the sleeve 100 to the shaft 95 under control of a clutch generally indicated in the drawings by the numeral 101, and shown on a larger scale in Figs. XIII and XIV. This clutch 101 comprises opposed coupling members in the form of discs 102, 103 whereof the former is keyed to the sleeve 100, while the latter 103 has capacity for movement toward and away from the former 102 by virtue of being axially-slidable on a square bushing 104 keyed to the shaft 95, see Fig. XIV. The clutch members or discs 102, 103 are provided with teeth 105 capable of interlocking but normally held separated in opposition to a compression spring 106, by a wedge shoe 107 which engages between a circumferential facing flange 108, on the disc 102, and a cam block 109 on the periphery of the opposing clutch disc 103. The wedge shoe 107 is fixed to a rock-shaft 110 (see Fig. XIII) so as to be swingable to the dot-and-dash line position indicated in said illustration. Immediately upon withdrawal of the wedge shoe 107, the clutch member or disc 103 is urged forwardly by the compression spring 106 for meshing engagement of the teeth thereon with those of the member or disc 102. As a convenient means for retracting the wedge shoe 107, I provide a treadle 111 adjacent the foot of the frontal column 18, Figs. III and IV, said treadle being connected by a link 112 with a lever arm 113 keyed on the rock shaft 110. Depression of the treadle 111 is opposed by a helical spring 114 abutting at one end against a fixture 115 rigidly mounted in the apparatus sub-framework, and at the opposite end against an adjustable collar 116 on a slide rod 117 having one extremity guided in said fixture 115, and the other pivotally connected at 118 to the wedge shoe 107. To set the apparatus in motion, it is necessary to depress the treadle 111, for but an instant to permit interengagement between the clutch members or discs 102, 103 and thereby affecting coupling of the sleeve 100 with the shaft 95. The just explained motion continues, however, only for one complete revolution of the shaft 95, as determined by subsequent automatic action of the wedge shoe 107 in spreading the clutch members or discs 102, 103 to their normal separated positions, as illustrated in Fig. XIV. Retrogressive movement, incidental to the operation of the main shaft 95, is prevented by engagement of a detent 119 with a ratchet wheel 120 secured to said shaft, see Figs. I and IV.

The rollers 25, by which the fabric F is progressed through the apparatus, receive motion from the same source of power that serves the shed formers 45, the interposed mechanism being as follows:

To the rear end of the line shaft 30 which carries the several spiral pinions 29, is affixed a ratchet wheel 121 picked by a pawl 122 carried by an arm 123 mounted for oscillation on the rear end of said shaft. The outer end of the arm 123 is coordinated by a link 124 (see Fig. XI) with a crank 125 secured to the rear end of a counter-shaft 126 adapted to be driven from the main shaft 95 through the medium of a miter gear couple comprehensively indicated 127 in Figs. I and IV, and thereby given a single rotation with each actuation of the apparatus. In order that the extent of motion imparted to the progressing rolls 25 may be accurately regulated, the eccentric pin 128 is made adjustable along the crank 125 by the means illustrated in Fig. XII. As shown, the eccentric pin 128 projects laterally from a block 129 located within a longitudinal groove 130 of the crank 125 which is engaged by an adjusting screw 131 rotatable in bearings at opposite ends of said crank 125. At one end, the screw 131 is provided with a manipulating head 132 for convenience in effecting adjustment. With the means just described it is possible to adjust the throw of the pawl 122, and vary the influence of the latter upon the ratchet wheel 121 which is instrumental in causing intermittent rotation of the traction rollers 25 and progressive movement of the fabric F.

Referring again to Fig. II, it will be noted that the wire engaging teeth 48, 49 are not directly attached to the opposing jaws 46, 47 of the shed formers 45, but to plate elements 135 that are removably secured to said members by wing nuts 136 engaging projecting screw studs. This arrangement permits ready and quick interchange of elements having teeth differently spaced so that the apparatus may be adapted for weaving wire fabrics with correspondingly different pitch of the diamond meshes. The teeth 48, 49 are furthermore separately attached, by screws or other suitable fastening devices, to the elements 135 to enable easy replacement in the event of breakage of one or more of them. As shown in Fig. VIII, the ends of the teeth 48, 49 are notched laterally as at 137 to receive and centralize the wire strands, and at the rear have lateral offsets 138 with longitudinal recesses 139 to form, collectively considered, continuous guides for receiving the new wire strands S, S' which are to be incorporated in the fabric F, the depressions being preferably tapered as illustrated, to afford easy approaches and thereby facilitate introduction of said wires. The positions of the crossed strands in the fabric F is determined by stops 140 which limit the extent to which they may be initially inserted in the sheds established by the respective teeth 48, 49, said stops being located adjacent the last teeth at the inward ends of the lower members 48 of the shed formers 45, as shown in Fig. V.

Briefly described, the operation of the apparatus is as follows:

To begin with, it is to be assumed that the apparatus comes to rest after each actuation with the opposing jaws 46, 47 of the two shed formers 45 in closed position, and with the teeth 48, 49 flexing the trailing ends of alternate strands of the fabric F in opposite directions—as shown in Fig. VI—to provide the sheds. New strands S, S' are thereupon placed in the sheds in crossed relation, see Fig. V, such placement being facilitated by the guides jointly afforded by the lateral offsets 138 of the teeth 48, 49 of the shed formers 45. With the new strands S, S' properly positioned, the operator depresses the treadle 111 to retract the wedge shoe 107 from between the opposing disc members 102, 103 of the clutch 101, thereby effecting automatic coupling of the sleeve 100 with the main shaft 95 to set the apparatus in motion. Incidental to turning of the main shaft 95 one complete revolution for each actuation of the apparatus, motion is transmitted (through the various interposed instrumentalities previously described, including the vertical coordinating shafts 87) simultaneously to the rotatable discs 68, 77 of the shed former actuating means at opposite angular sides of the main frame. As a result, the shiftable bars 53, 59, respectively associated with the shed formers 45, are first moved forward by cooperation of the latches 63, 75 with the respective pins 67, 76 on the discs 68, 77 to effect approach of the teeth 48, 49, and secondly upon subsequent release to the action of the "kick-off" devices 89, they temporarily assume under the assistance of gravity, the dot-and-dash line positions indicated in Fig. II; or, with the teeth 48, 49 relatively separated. During the period of separation of the shed formers 45, the fabric F is progressed, by motion imparted to the tractile rolls 25 under the action of the pawling mechanism shown in Fig. XI, in the manner previously explained, with resultant transposal of the trailing wire ends of said fabric relative to the teeth 45, 49 of the opposing members 46, 47 respectively, so that the sheds are reversed upon subsequent approach of the teeth (which immediately follows), the apparatus thereafter coming to rest with the shed formers 45 closed after a complete cycle of the operations just recited. By employing crimped wire with the crests of the crimps spaced say a quarter of an inch apart, and with proper interchange of the shed forming elements, it is possible to produce with the apparatus described, wire mesh ranging from one-half inch pitch to an inch and a half pitch, or even more, as may be desired or required.

Having thus described our invention, we claim:

1. In apparatus for fabricating diamond wire mesh, the combination of automatically-operative vertically reciprocable and gravity-influenced means adapted to successively form angularly-disposed sheds of wire ends trailing from previously-formed fabric with alternate reversals in the relation of such wire ends, and mechanism co-ordinated with the shed forming means operative to advance the fabric during temporary separation of the shed formers and successive shed formations.

2. In apparatus for fabricating diamond wire mesh, the combination of automatically-operative vertically reciprocable and gravity influenced means adapted to successively form angularly-disposed sheds of wire ends trailing from previously-formed fabric with alternate reversals in the relation of such wire ends; co-ordinated means operative to advance the fabric during temporary separation of the first mentioned means and successive shed formations; and means to automatically stop the apparatus after each cycle of operations to permit placing of new strands in crossed relation within the sheds.

3. In apparatus for fabricating diamond wire mesh, the combination of gravity-influenced automatically-operative means adapted to successively form angularly-disposed sheds including vertically movable opposing members having instrumentalities for individually engaging respectively alternate wire ends trailing from previously-formed fabric; automatically-operative means to move said opposing members relatively to form the sheds; and co-ordinated progressing means functional to advance the fabric during an interval of temporary separation between the opposing members to effect transposal of the trailing wire ends from the province of one set of engaging instrumentalities to that of the other set for reversal of the sheds.

4. In apparatus for fabricating diamond wire mesh, the combination of vertically reciprocable gravity-influenced means adapted to successively form angularly-disposed sheds of wire ends trailing from previously-formed fabric, and with alternate reversals in the relation of such wire ends; means operative to advance the fabric between successive shed formations; and drive mechanism coordinating the movements of the shed forming means and the fabric advancing means, said drive mechanism including a manually-controllable clutch provided with means for automatically disengaging it to stop the apparatus upon completion of each cycle of operations.

5. In apparatus for fabricating diamond wire mesh, the combination of means adapted to successively form angularly-disposed sheds of wire ends trailing from previously-formed fabric, and with alternate reversals in the relation of such wire ends; means to advance the fabric between successive shed formations; drive mechanism coordinating the movements of the shed forming means and the fabric advancing means, said drive mechanism including a clutch comprising cooperative coupling members, a wedge shoe capable of automatically effecting separation of said coupling members to stop the apparatus upon completion of each cycle of operations; and manually operative means whereby said wedge shoe may be retracted to start the apparatus.

6. In apparatus for fabricating diamond wire mesh, the combination of automatically-operative means adapted to successively form angularly-disposed sheds of wire ends trailing from previously-formed fabric, and with alternate reversals in the relation of such wire ends; co-ordinated means operative to advance the fabric between successive shed formations including cooperative pairs of traction rollers; and mechanism for imparting the necessary intermittent movement to one set of the traction rollers aforesaid.

7. In apparatus for fabricating diamond wire mesh, the combination of automatically-operative vertically reciprocable gravity-influenced means adapted to successively form angularly disposed sheds of wire ends trailing from previously-formed fabric, and with alternate reversals in the relation of such wire ends; and co-ordinated means operative to advance the fabric between the successive shed formations, said latter means being capable of adjustment to pre-order the pitch of the fabric meshes.

8. In apparatus for fabricating diamond wire mesh, the combination of automatically-operative vertically reciprocable gravity-influenced means adapted to successively form angularly disposed sheds of wire ends trailing from previously-formed fabric, and with alternate reversals in the relation of such wire ends; means to advance the fabric between successive shed formations including cooperative pairs of traction rollers; a line shaft with gear connections to one set of said traction rollers; a ratchet wheel on said shaft; an oscillating pawl for picking said ratchet; and means enabling adjustment of the throw of said pawl to vary the increment of fabric progression and thereby predetermine the pitch of the fabric meshes.

9. In apparatus for fabricating diamond wire mesh, the combination of automatically-operative vertically reciprocable means to successively form angularly disposed sheds of wire ends trailing from previously-formed fabric, and with alternate reversals in the relation of such wire ends; means to advance the fabric between successive shed formations including cooperative pairs of upper and lower traction rollers, the upper set of said rollers being supported for bodily movement relative to the lower set and manually operative means effective to elevate the upper set of rolls and permit initial threading of the fabric between the two groups.

10. In apparatus for fabricating diamond wire mesh, the combination of automatically-operative means to successively form angularly disposed sheds of wire ends trailing from previously-formed fabric, and with alternate reversals in the relation of such wire ends; and means to advance the fabric between successive shed formations including cooperative pairs of traction rollers, one set of said rollers being journaled in a pivoted frame so as to be retractable bodily relative to the other set to permit initial threading of fabric between the two groups.

11. In apparatus for fabricating diamond wire mesh, the combination of angularly-disposed shed formers, each comprising vertically movable opposing members having individual wire-engaging instrumentalities secured to them with capacity for ready removal and interchanging; automatically-operative co-ordinated means for effecting mechanical approach of the opposing members to form the sheds, and means effective to initiate gravitational separation of said opposing members.

12. In apparatus for fabricating diamond wire mesh, the combination of angularly-disposed gravity-influenced shed formers, each comprising a pair of vertically-reciprocable opposing members sustaining instrumentalities for individually engaging alternate wires trailing from the metallic fabric to flex them in opposite directions in forming the sheds; automatically-operable co-ordinated shifter members adapted to effect approach of the opposing members for the purpose stated; and means associated with said members to facilitate introduction of new strands of wire into the sheds.

13. In apparatus for fabricating diamond wire mesh, the combination of angularly-disposed shed formers, each comprising a pair of vertically reciprocable opposing members removably supporting instrumentalities for individually engaging alternate trailing wires of the metallic fabric to flex them in opposite directions in forming the sheds; automatically operative co-ordinated shifter bars adapted to effect approach of the opposing members for the purpose stated; and stops on said members serving to limit the extent of projection of new strands of wire into the sheds and predetermine their ultimate positions in the fabric.

14. In apparatus for fabricating diamond wire mesh, the combination of angularly-disposed vertically-reciprocable and gravity-influenced shed formers, each comprising a pair of opposing members; elements with individual wire-engaging instrumentalities removably attached to said opposing members; and mechanism operative to effect simultaneous approach of the opposing members to flex alternate trailing wire ends of the fabric and thereby form the sheds.

15. In apparatus for fabricating diamond wire mesh, the combination of angularly-disposed vertically reciprocable shed formers, each comprising a pair of opposing jaws; and plate elements having wire-engaging teeth thereon, said wire-engaging teeth being separately attached to the plate elements for convenience of replacement, and affording, collectively, continuous guides for facilitating introduction of new strands of wire into the sheds; and automatically swingable bars adapted to effect approach of the opposing jaws aforesaid to form the sheds.

16. In apparatus for fabricating diamond wire mesh, the combination of angularly-disposed vertically guided and gravity-influenced shed formers, each comprising a pair of opposing jaws respectively supporting projecting teeth for individually engaging alternate wires trailing from the fabric to flex them in opposite directions in forming the sheds; and shifter members for effecting approach of the opposing members aforesaid for the purpose stated.

17. In apparatus for fabricating diamond wire mesh, the combination of angularly-disposed vertically reciprocable shed formers, each comprising a pair of opposing members respectively having projecting teeth for individually engaging alternate trailing wires of the metallic fabric to flex them in opposite directions in forming the sheds; means to guide said opposing members to reciprocative movement; pivotally-suspended bars adapted to cooperate with anti-friction rolls carried by the opposing members; and means for longitudinally shifting said bars simultaneously to effect approach of the opposing members for the purpose stated.

18. In apparatus for fabricating diamond wire mesh, the combination of angularly-disposed vertically reciprocable shed formers, each comprising a pair of opposing members respectively having instrumentalities for individually engaging alternate trailing wires of the metallic fabric to flex them in opposite directions in forming the sheds; means to guide the said opposing members to reciprocative movement; swingably-suspended bars adapted to cooperate with anti-friction rollers on said opposing members; and means for shifting said bars longitudinally in effecting approach of the opposing members for the purpose stated; said means including rotary discs having eccentric pins adapted to engage, during each revolution, with gravity latch hooks pivotally mounted on the swingable bars.

In testimony whereof, we have hereunto signed our names at Norristown, Pa., this 11th day of August, 1925.

JOHN K. GEHRET.
MAHLON P. GEHRET.